July 30, 1963  G. S. BAHRS ET AL  3,099,799
FREQUENCY TO VOLTAGE CONVERTER
Filed Dec. 3, 1958  2 Sheets-Sheet 1

GEORGE S. BAHRS
DALTON W. MARTIN
MALCOM M. McWHORTER
INVENTORS

BY
*Flehr and Swain*
ATTORNEYS

United States Patent Office 3,099,799
Patented July 30, 1963

1

3,099,799
FREQUENCY TO VOLTAGE CONVERTER
George S. Bahrs, 799 Berkeley Ave., Menlo Park, Calif.;
Dalton W. Martin, 3200 Louis Road, Palo Alto, Calif.;
and Malcolm M. McWhorter, 150 Gabardler Way,
Menlo Park, Calif.
Filed Dec. 3, 1958, Ser. No. 777,936
12 Claims. (Cl. 329—126)

This invention relates generally to frequency to voltage converters.

Frequency to voltage converters employing clipping amplifiers which operate on the input signal and which serve to charge and discharge a precision capacitor are well known. In these instruments, the capacitor current is applied to a rectifier and the average rectifier output gives and indication of the applied frequency. The clipping circuit charges and discharges the capacitor between predetermined voltage limits. The limits are determined by suitable clamping means, such as diodes.

In our copending applications Serial No. 778,015, filed Dec. 3, 1958, filed simultaneously herewith, there is described a frequency to voltage converter in which a charging circuit serves to form squarewave current signals having a frequency corresponding to the input frequency. These squarewaves serve to charge and discharge a capacitor so that one of its terminals undergoes voltage excursions between fixed voltage levels. The voltage levels may be determined by an overdriven amplifier or by clipping diodes connected to one terminal of the capacitor. Switching or rectifying means is connected to the other terminal of the capacitor. The switching means serves to conduct the charging and discharging currents from the capacitor. The current through one of the switching means is employed to give an indication of the average charging or discharging current. When relatively large output voltages are required, operation of the circuit is not linear. In said copending application there is described a bootstrap circuit for providing linear operation with relatively high output voltage.

It is a general object of the present invention to provide a frequency to voltage converter of the above character in which a precision capacitor has one terminal subjected to fixed voltage excursions and the other terminal undergoes relatively small excursions so that the net voltage excursions experienced by the capacitor are relatively constant.

It is another object of the present invention to provide an apparatus of the above character in which the voltage excursions of the capacitor are relatively independent of the output voltage whereby the converter has good linearity.

It is another object of the present invention to provide a circuit which includes an amplifier connected in the circuit with the capacitor to thereby isolate the capacitor from the output circuit.

It is a further object of the present invention to provide a circuit which includes a pair of transistors connected in an inverted common emitter configuration for providing charging current and determining the voltage to which the capacitor is charged and discharged.

It is still a further object of the present invention to provide a circuit which serves to dispense a fixed charge for each cycle of input information.

These and other objects of the invention will become more clearly apparent from the following description when taken in conjunction with the accompanying drawings.

Referring to the drawing:

FIGURE 1 is a schematic block diagram of a frequency to voltage converter in accordance with the present invention;

2

Figure 1:
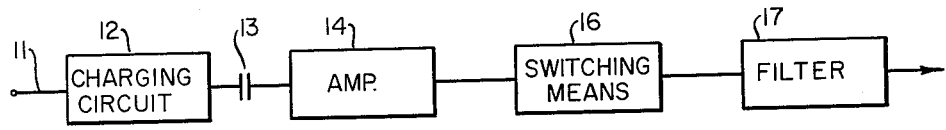
Figure 5:
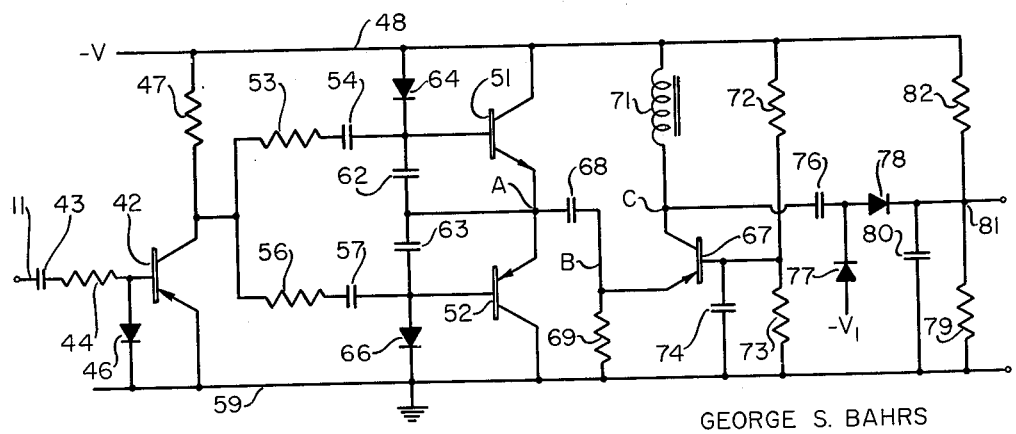
FIGURE 5 is a circuit diagram showing a frequency to voltage converter in accordance with the invention.

Referring to FIGURE 1, the input signal is applied to the terminals 11 to the charging circuit 12. The charging circuit may be any circuit suitable for charging a capacitor to a predetermined fixed voltage and discharging it to some other fixed voltage a fixed number of times for each cycle of the input signal. A suitable charging circuit is described in said copending application. A novel circuit is illustrated in FIGURE 5 and will be presently described in detail.

The current output from the charging circuit 12 is applied to one terminal of the precision capacitor 13. An A.-C. amplifier 14 is connected to the other terminal. The amplifier 14 may be any amplifier having low input impedance, high output impedance, high voltage gain and constant current gain. For example, a common base transistor amplifier meets these requirements. A transistor amplifier will be presently described with reference to FIGURE 5. Another example is a grounded grid vacuum tube amplifier. The output of the amplifier is applied to a switching circuit 16 which alternately provides paths for charging and discharging current from the capacitor. A filter 17 is associated with one of said paths and provides an output signal which is proportional to the average current flowing through the one path. Suitable switching and filter circuits will be presently described with reference to FIGURE 5.

Figure 2:
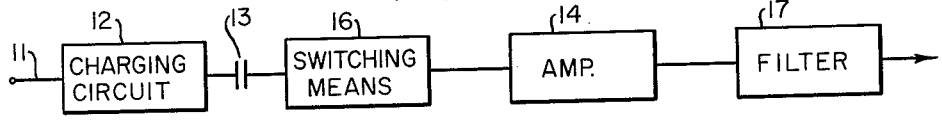
FIGURE 2 is another embodiment of the frequency to voltage converter of the present invention.

Because of the high voltage gain and low input impedance of the amplifier, the voltage change at the second terminal of the capacitor is very small and is relatively independent of the output voltage. The voltage excursion at the first terminal of the capacitor is determined by the charging circuit and is virtually constant. Thus, the net (terminal to terminal) voltage excursion to which the capacitor is subjected is virtually constant. The circuit of FIGURE 1 also has the advantage that the voltage changes at the second terminal are also relatively immune to voltage variations introduced by the switching circuit.

Where voltage variations in the switching circuit can be tolerated, the amplifier may follow the switching means. A suitable arrangement is shown in FIGURE 2.

Figure 3:
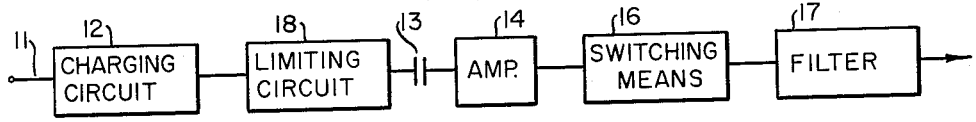
FIGURE 3 is another embodiment of the invention.
Figure 4:
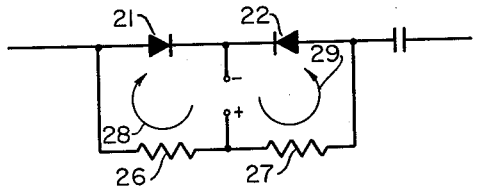
FIGURE 4 is a circuit diagram of a current limiting circuit suitable for use in the invention.

It is desirable to limit the charging current whereby the amplifier is not overloaded. In FIGURE 3, a current limiting circuit 18 is shown connected between the charging circuit and the precision capacitor. A suitable circuit is shown in FIGURE 4. Another technique for limiting the charging current is described in connection with FIGURE 5.

The circuit of FIGURE 4 includes serially connected oppositely poled diodes 21 and 22. The output of the charging circuit is connected to the diode 21. A series combination of resistors 26 and 27 is connected in parallel with the diodes. A suitable floating source of D.-C. voltage is connected between the common terminal of the resistors and the common terminal of the diodes. Bias current flows as indicated by the arrows 28 and 29.

When the applied current becomes as great as the bias current, the appropriate diode opens and the current flowing to the load then becomes equal to the bias current. The circuit of FIGURE 4 thus allows current to flow in either direction with any magnitude up to but not exceeding the bias current.

In FIGURE 5 there is illustrated a complete circuit.

The input signal is applied to the terminal 11 which is coupled to the base of the transistor 42 through the capacitor 43 and resistor 44. A diode 46 serves to provide a discharge path to prevent capacitor 43 from becoming charged by the base current drawn from transistor 42. The transistor 42 is connected as a grounded emitter amplifier. The collector of the transistor is resistively connected through the resistor 47 to the line 48.

Transistor 42 serves to clip and amplify the input signal so that a rectangular signal appears at the collector. This signal, which has the same frequency as the input signal, is coupled to the bases of transistors 51 and 52 through the serially connected resistor 53 and capacitor 54, and resistor 56 and capacitor 57, respectively.

The transistors 51 and 52 are connected in an inverted common emitter configuration with the collector of the transistor 51 connected to the line 48, and the collector of the transistor 52 connected to the line 59.

The common emitters of the transistors are capacitively connected to the base of the transistors 51 and 52 by feedback capacitors 62 and 63, respectively. The capacitors provide feedback to limit the rate at which the capacitor 68 is charged, which in turn limits the amplitude of the current pulses applied to the amplifier 16. A diode 64 provides a discharge path to prevent capacitor 54 from becoming charged by the repetitive flow of base current drawn from transistor 51 while diode 66 similarly provides a discharge path for capacitor 57.

The other terminal of precision capacitor 68 is connected to the emitter of transistor 67 so that the charging and discharging currents flow into that emitter. The transistor is connected in a grounded base amplifier circuit. Emitter resistor 69 connects the emitter to the line 59. Inductor 71 provides a path through which the D.C. voltage on line 48 reaches the collector of transistor 67. The inductor presents a high impedance to the signal frequency so that most of the A.C. current developed by the common-base amplifier is applied through capacitor 68 to the diodes 77 and 78. The serially connected resistors 72 and 73 serve as a voltage divider for applying the proper voltage to the base of the transistor. The base is by-passed to the line 59 by the capacitor 74.

The output of transistor 67 is applied to one terminal of the capacitor 76. The other terminal of the capacitor is connected to the switching diodes 77 and 78 which are poled in opposite directions so that current flowing in one direction through capacitor 76 is passed to the —V1 terminal while current flowing in the opposite direction is passed to terminal 81 so that it flows through resistor 79. A large capacitor 80 is shunted across the resistor and filters the voltage across the resistor. The output voltage, across resistor 79, is available at terminal 81. The voltage gives an indication of the average current flowing through the diode 78.

A resistor 82 provides a current of fixed magnitude to the terminal 81. By adjusting the resistor 82, the output may be made zero for any input frequency $f_0$. Any excursions of frequency above and below this reference frequency will give a positive or negative voltage at the terminal 81 which is indicative of the frequency difference between $f_0$ and the applied frequency $f$.

Operation of the converter is as follows: The incoming signal causes transistor 42 to be switched alternately "on" and "off." When 42 is "off," current flowing through resistor 47 divides between resistors 53 and 56. This current tends to turn transistor 52 "on" and to turn transistor 51 "off." Assume that node A is initially at —V. As 52 conducts, it tends to discharge capacitor 68 so that the voltage at A rises toward 0. This change with time of the voltage at A causes current to flow in capacitor 63 in such a direction as to oppose the current furnished through resistor 56. This opposing current is, in effect, a negative feedback which tends to limit the rate of change of voltage at node A, and thus to limit the charging current applied to 68. As the voltage at A approaches 0, the transistor 51 goes into saturation with the emitter voltage going within a few millivolts of 0.

When transistor 42 is turned "on," current is applied to resistors 53 and 56 of such polarity as to turn 51 "on" and to turn 52 "off." Transistor 51 then charges capacitor 68 toward —V volts. The charging rate is limited by capacitor 62. As the voltage at A approaches —V, transistor 51 goes into saturation with the emitter voltage going within a few millivolts of —V. Thus, the transistors 51 and 52 comprise a circuit which alternately charges and discharges capacitor 68 at controlled rates. Since, in saturation, the voltage between emitter and collector is relatively low, the peak to peak swing of node A will be substantially equal to the voltage difference between the lines 48 and 59.

If the other end, node B, of the capacitor 68 were connected directly to the switching diodes 77 and 78, the circuit would be slightly temperature sensitive and rather non-linear. The reason for this may be understood by assuming that one end of capacitor 68 is connected directly to node C. The net voltage excursions experienced by capacitor 68 each cycle will be the voltage excursions at node A minus the voltage excursions at node C. The latter quantity depends upon the forward voltage drops of the diodes 77 and 78 and upon the output voltage across capacitor 80. Since the forward drop is dependent on temperature and since the output voltage varies with input frequency, the device is both temperature sensitive and non-linear. For example, with a reference voltage —V of 25 volts, the output voltage will change approximately 0.01 percent of full scale for each degree Farenheit change in temperature.

By interposing the amplifying stage including the transistor 67 between the capacitor 68 and node C, the problem of temperature dependence and non-linearity due to effects of the output voltage on the reference voltage is greatly lessened.

A suitable amplifier is one having low input impedance, high output impedance, high voltage gain, and constant current gain. A common base transistor amplifier meets these requirements.

Because of the high voltage gain and low input impedance of the amplifier, and the voltage change at node B, $e_B$, will be very small. The change in voltage to which node A is subjected during each cycle departs only very slightly from the reference voltage. Because of the stable current gain, the charge and discharge current flowing from capacitor 68 is applied accurately to diodes 77 and 78. The average current through diode 78 is $$V \cdot C \cdot f \cdot (current\ gain\ of\ the\ amplifier)$$

where V is the voltage on line 48, C is the capacitance of capacitor 68 and $f$ is the frequency of the signal applied to terminal 11.

Because of the high output impedance of the amplifier, the voltage swing at the node C has very little effect on the performance of the circuit. The circuit is relatively independent of changes in the diode drop and of the level of the output voltage. Large values of output voltage are obtained without degrading the linearity of the circuit.

Figure 6:
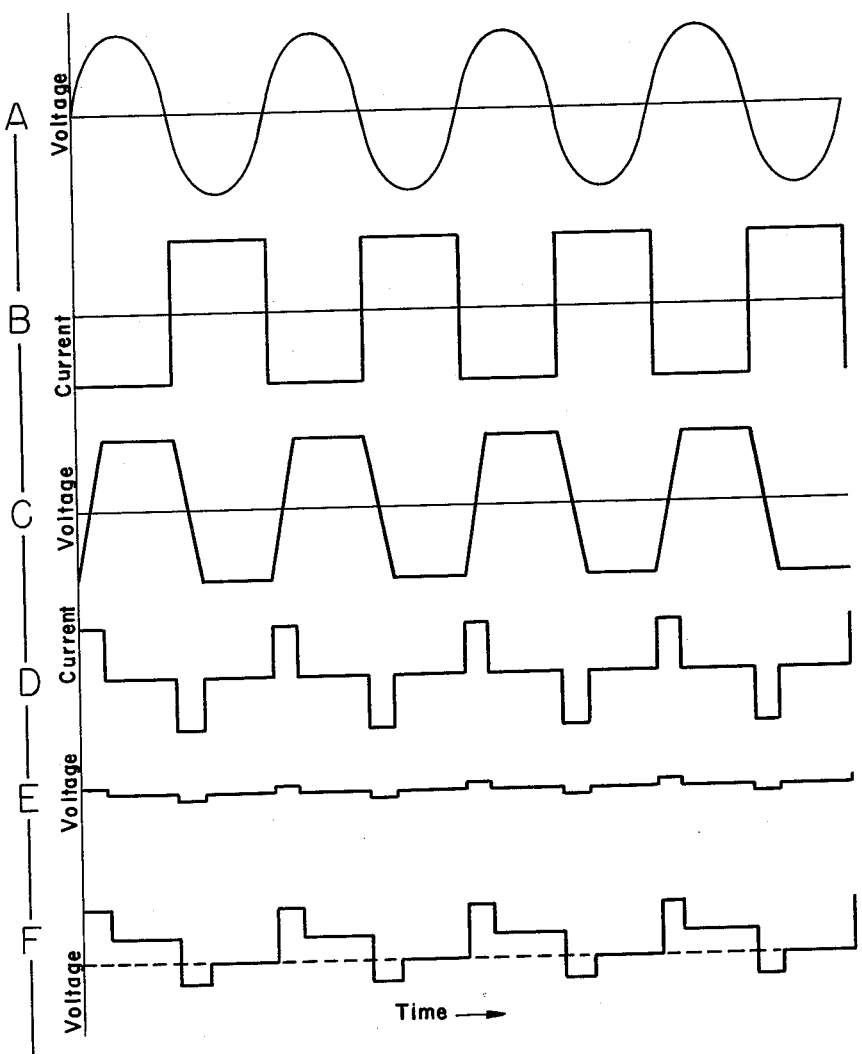
FIGURES 6A–F illustrate the waveforms at various points in the circuit of FIGURE 5.

Referring to FIGURE 6, the waveforms at various points in the circuit are illustrated. The input signal is illustrated at FIGURE 6A. The output current of the common emitter transistor section is illustrated in FIGURE 6B. The voltage at node A is illustrated in FIGURE 6C. It is noted in FIGURE 6C that the capacitor is charged and discharged only during a relatively small portion of each cycle. Referring to FIGURE 6D, the waveform of current through the capacitor is illustrated. Because the current gain of the amplifier is very close to unity, substantially the same current waveform is applied to the junction of the diodes 77 and 78 (node C). The voltages at nodes B and C are shown in FIGURES 6E and F respectively.

Apparatus was constructed in accordance with the foregoing in which the components of FIGURE 5 had the following values:

Voltage:
- —V ............................................. 20 volts.
- —V1 ............................................ 1.5 volts.

Transitors:
- 42 ............................................. 2N192.
- 51 ............................................. 2N35.
- 52 ............................................. 2N192.
- 67 ............................................. 2N415A.

Diodes:
- 46 ............................................. 1N96.
- 64 ............................................. 1N63.
- 66 ............................................. 1N63.
- 77 ............................................. Hewlett-Packard Microjunction.
- 78 ............................................. Hewlett-Packard Microjunction.

Capacitors:
- 43 ............................................. .25 mf.
- 54 ............................................. .1 mf.
- 57 ............................................. .1 mf.
- 62 ............................................. 680 mmf.
- 63 ............................................. 680 mmf.
- 68 ............................................. 5000 mf.
- 74 ............................................. .25 mf.
- 76 ............................................. .25 mf.
- 80 ............................................. 2.0 mf.

Resistors:
- 44 ............................................. 2.2K ohms.
- 47 ............................................. 560 ohms.
- 53 ............................................. 6.8K ohms.
- 56 ............................................. 4.7K ohms.
- 69 ............................................. 1.8K ohms.
- 72 ............................................. 3.9K ohms.
- 73 ............................................. 10K ohms.
- 79 ............................................. 4.25K ohms.
- 82 ............................................. 20K ohms.

Inductor: 71 ..................................... 5 henrys.

A circuit constructed in accordance with the foregoing was operated over a frequency range of 1 kc. to 10 kc. (ten to one) with the output voltage varying between zero and one volt. The performance of the circuit was as follows. Non-linearity over the 10:1 frequency range, 0.12 percent. Drift when subjected to a 72° F. temperature change—0.6 percent due mainly to a shift in capacitance of the precision capacitor as a result of the temperature change. With the component values shown the output voltage was zero at 10 kc.; —1.4 volts at 6 kc.; and +1.4 volts at 14 kc. The non-linearity over this frequency range was less than 0.07 percent.

Thus, it is seen that an improved frequency to voltage converter is provided. The converter gives relatively linear output voltage over a broad range of frequencies. Large output voltages are available.

We claim:

1. A frequency to voltage converter comprising a precision capacitor having first and second terminals, means connected to receive an input signal and to charge and discharge said capacitor in such a manner that the voltage of the first terminal of said capacitor is swung between predetermined limits a fixed number of times for each cycle of the input signal, switching means connected in circuit with the second terminal of said capacitor to direct charging and discharging current therefrom, amplifying means connected in circuit with said switching means and serving to pass instantaneously at least one of said currents and to isolate said second terminal from voltage variations, and means connected to receive the output of said amplifying means and serving to derive an output signal which is proportional to the average charging current.

2. A frequency to voltage converter comprising a precision capacitor having first and second terminals, means connected to receive an input signal and to charge and discharge said capacitor in such a manner that the voltage of the first terminal of said capacitor is swung between predetermined limits a fixed number of times for each cycle to the input signal, amplifying means connected in circuit with the second terminal of said capacitor and serving to pass currents from the capacitor and maintain the second terminal at substantially constant voltage, switching means connected to receive the output of said amplifier and serving to conduct charging and discharging current from said amplifier, means connected in circuit with said switching means to derive an output signal which is proportional to the average charging current.

3. A frequency to voltage converter comprising a precision capacitor having first and second terminals, means connected to receive an input signal and to charge and discharge said capacitor in such a manner that the voltage of the first terminal of said capacitor is swung between predetermined limits a fixed number of times for each cycle of the input signal, switching means connected to the second terminal of said capacitor and serving to direct charging and discharging current therefrom, amplifying means connected in circuit with said switching means and serving to pass instantaneously at least one of said currents and isolate the switching means from variations in output voltage, and means connected to receive the output of said amplifier serving to provide an output signal which is proportional to the average charging current.

4. A frequency to voltage converter comprising a precision capacitor having first and second terminals, means connected to receive an input signal and to charge and discharge said capacitor in such a manner that the voltage of the first terminal of said capacitor is swung between predetermined limits a fixed number of times for each cycle to the input signal, current limiting means serving to limit the amplitude of the charging and discharging currents applied to said first terminal, switching means connected in circuit with the other terminal of said capacitor serving to direct charging and discharging current therefrom, amplifying means connected in circuit with said switching means and serving to pass at least one of said currents and to isolate said second terminal from voltage variations, and means connected in circuit with said switching means serving to derive an output signal which is proportional to the average charging current.

5. A frequency to voltage converter comprising a precision capacitor having first and second terminals, means connected to receive an input signal and to charge and discharge said capacitor in such a manner that the voltage of the first terminal of said capacitor is swung between predetermined limits a fixed number of times for each cycle of the input signal, switching means connected in circuit with the other terminal of said capacitor serving to conduct charging and discharging current therefrom, amplifying means having low input impedance, high output impedance, high voltage gain, and relatively constant current gain connected in circuit with said switching means serving to pass instantaneously at least one of said currents, and means connected to receive the output of said amplifier serving to derive an output signal which is proportional to the average charging current.

6. A frequency to voltage converter comprising means connected to receive an input signal frequency and serving to form a limited output signal having the same frequency, said signal varying between predetermined limits a fixed number of times for each cycle, a precision capacitor having first and second terminals, said first terminal being connected to receive said limited output signal, switching means connected in circuit with the other terminal of said capacitor serving to direct charging and discharging current therefrom, amplifying means connected in circuit with said switching means and serving to pass instantaneously at least one of said currents and isolate said second terminal from voltage variations, and means connected to receive the output of said amplifier serving to form an output signal which is proportional to the average charging current.

7. A circuit of the character described comprising a precision capacitor having first and second terminals, means connected to receive an input signal and to charge and discharge said capacitor in such a manner that the voltage of the first terminal of said capacitor is swung between predetermined limits in response to the input signal, switching means connected in circuit with the second terminal of said capacitor serving to direct charging and discharging current therefrom, and amplifying means connected in circuit with said switching means and serving to pass instantaneously at least one of said currents and isolate said second terminal from voltage variations.

8. A circuit of the character described comprising a precision capacitor having first and second terminals, means connected to receive an input signal and to charge and discharge said capacitor in such a manner that the voltage of the first terminal of said capacitor is swung between predetermined limits in response to the input signal, amplifying means connected to the second terminal of said capacitor, switching means connected to receive the output of said amplifier and serving to conduct charging and discharging current from said amplifier, and output means connected to said switching means.

9. A circuit of the character described comprising a precision capacitor having first and second terminals, means connected to receive an input signal and to charge and discharge said capacitor in such a manner that the voltage of the first terminal of said capacitor is swung between predetermined limits in response to the input signal, switching means connected to the second terminal of said capacitor and serving to direct charging and discharging current therefrom, amplifying means connected in circuit with said switching means and serving to pass instantaneously at least one of said currents and isolate the switching means from variations in output voltage, and output means connected to said switching means.

10. A circuit of the character described comprising a precision capacitor having first and second terminals, means connected to receive an input signal and to charge and discharge said capacitor in such a manner that the voltage of the first terminal of said capacitor is swung between predetermined limits in response to the input signal, current limiting means serving to limit the amplitude of the charging and discharging currents applied to said first terminal, switching means connected in circuit with the other terminal of said capacitor serving to direct charging and discharging current therefrom, amplifying means connected in circuit with said switching means and serving to pass at least one of said currents and isolate said second terminal from voltage variations, and output means connected to said switching means.

11. A circuit of the character described comprising a precision capacitor having first and second terminals, means connected to receive an input signal and to charge and discharge said capacitor in such a manner that the voltage of the first terminal of said capacitor is swung between predetermined limits in response to the input signal, switching means connected in circuit with the other terminal of said capacitor serving to conduct charging and discharging current therefrom, amplifying means having low input impedance, high output impedance, high voltage gain, and relatively constant current gain connected in circuit with said switching means serving to pass instantaneously at least one of said currents, and output means connected to said amplifying means.

12. A circuit of the character described comprising means connected to receive an input signal frequency and serving to form a limited output signal having the same frequency, said signal varying between predetermined limits in response to the input signal, a precision capacitor having first and second terminals, said first terminal being connected to receive said signal, switching means connected in circuit with the other terminal of said capacitor serving to direct charging and discharging current therefrom, amplifying means connected in circuit with said switching means and serving to pass instantaneously at least one of said currents and isolate said second terminal from voltage variations, and output means connected to said amplifying means.

References Cited in the file of this patent
UNITED STATES PATENTS

| | | |
|---|---|---|
| 2,259,070 | Krochmann | Oct. 14, 1941 |
| 2,403,557 | Sanders | July 9, 1946 |
| 2,431,766 | Miller et al. | Dec. 2, 1947 |
| 2,560,378 | White | July 10, 1951 |
| 2,720,584 | Sloughter | Oct. 11, 1955 |